Figure 1:
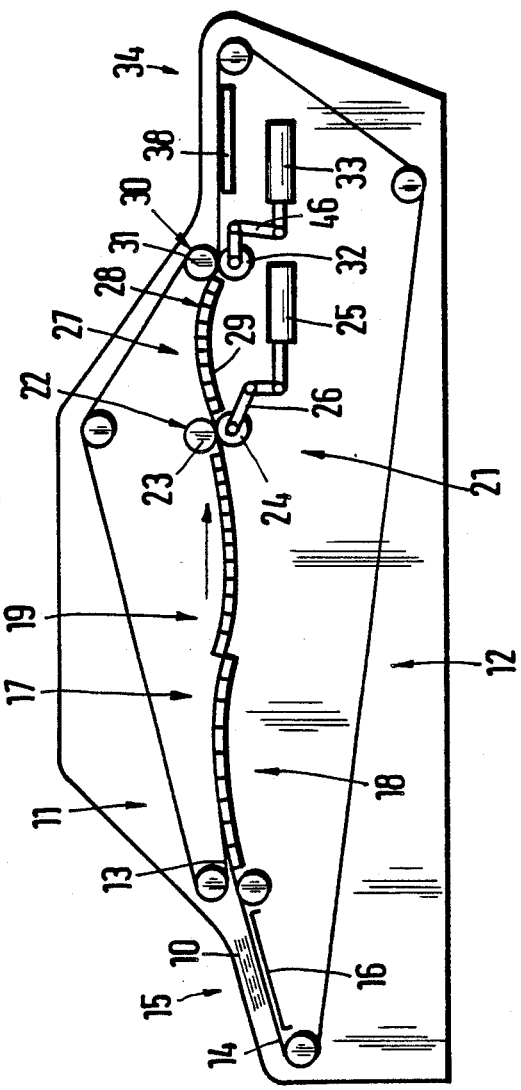

United States Patent [19]

Inselmann

[11] Patent Number: 4,897,147

[45] Date of Patent: Jan. 30, 1990

[54] PROCESS AND APPARATUS FOR BONDING TEXTILE SHEET-LIKE STRUCTURES

[75] Inventor: Jürgen Inselmann, Löhne, Fed. Rep. of Germany

[73] Assignee: Herbert Kannegiesser GmbH & Co., Fed. Rep. of Germany

[21] Appl. No.: 151,723

[22] Filed: Feb. 3, 1988

Related U.S. Application Data

[63] Continuation of Ser. No. 817,225, Jan. 8, 1986, abandoned.

[30] Foreign Application Priority Data

Jan. 26, 1985 [DE] Fed. Rep. of Germany ....... 3502608

[51] Int. Cl.$^4$ .............................................. B32B 31/00
[52] U.S. Cl. ....................................... 156/498; 100/38; 100/92; 100/138; 100/153; 100/167; 100/176; 156/163; 156/312; 156/324.4; 156/494; 156/499; 156/539; 156/580
[58] Field of Search ............... 156/163, 494, 312, 499, 156/324.4, 539, 580, 498; 100/38, 138, 92, 167, 153, 176

[56] References Cited

U.S. PATENT DOCUMENTS

| 2,107,485 | 2/1938 | Liebowitz | 156/312 |
| 2,219,065 | 10/1940 | Bruker et al. | 156/580 |
| 3,738,897 | 6/1973 | Bianchini | 100/153 |

FOREIGN PATENT DOCUMENTS 1385354 2/1975 United Kingdom .
1453872 10/1976 United Kingdom .

Primary Examiner—John J. Gallagher
Attorney, Agent, or Firm—Sughrue, Mion, Zinn, Macpeak & Seas

[57] ABSTRACT

Bonding apparatuses for textile sheet-like structures especially outer fabric and interlining, are conventionally equipped with a heating station consisting of heating plates for the sheet-like structures conveyed between conveyor belts and also with a linear-pressure device consisting of two pressure rollers. Now, in addition, the linear-pressure device is followed by surface-pressure device to stabilize the adhesive anchoring of the bonding agents.

3 Claims, 2 Drawing Sheets

PROCESS AND APPARATUS FOR BONDING TEXTILE SHEET-LIKE STRUCTURES

This is a continuation of application Ser. No. 817,225, filed Jan. 8, 1986, now abandoned.

DESCRIPTION

The invention relates to a process for bonding textile sheet-like structures, especially outer fabrics and (coated) interlinings, in which the sheet-like structures, lying on conveyor belts, are first heated and then bonded to one another by being pressed together linearly (linear pressure effect). The invention also relates to an apparatus for carrying out the process.

The bonding of textile sheet-like structures is used primarily in the manufacture of laundry articles and outer garments. Here, outer fabrics are bonded to interlinings which for this purpose have a coating consiSting of a suitable bonding agent, for example based on polyester or polyamide. Bonding is carried out under heat and pressure, and the plasticised bonding agent partially penetrates to the outer fabric and thus produces the bond.

In a known apparatus of the type mentioned in the introduction (German Offenlegungsschrift 3,303,504, corresponding to U.S. Pat. No. 4,560,431), the textile sheet-like structures lying on top of one another are conveyed over curved heating plates by means of two conveyor belts, the textile articles lying between two conveying strands of the conveyor belts, these conveying strands resting againt one another. The curved design of the heating plates ensures that the coneyor belts .or their conveying strands rest against the surface of the heating plates under tension. The bonding agent of the textile articles is activated (plasticised) by the heating plates.

After the heating plates, the conveying strands of the conveyor belts pass through a linear-pressure device in the form of two pressure rollers resting against one another under pressure. The sheet-like structures with the activated bonding agent are subjected, between these pressure rollers, to an increased linear pressure.

After the above-mentioned linear-pressure device, the textile articles are guided over a cooling plate in the region of a cooling station.

Starting from this state of the art, the object on which the invention is based is to increase the efficiency of apparatuses of this type (bonding presses), but particularly to reduce the cost in terms of energy, without the quality of the bonds being impaired.

To achieve this object, in the process according to the invention the bonding materials anchored in the sheet-like structures as a result of the linear pressure effect are stabilised in their adhesive anchoring, to prevent them from springing back, because the sheet-like structures are subsequently subjected to surface pressure (surface pressure effect).

The invention is based on the knowledge that, after the heated textile sheet-like structures have been pressed together between the pressure cylinders, because of the subsequent relief of pressure the bonding agents "spring back" and the anchoring of these in the textile articles consequently reverts to the original state. The aim of the invention is therefore, after the bonding agents have been subjected to (linear) pressure, to stabilize or consolidate the activated (plasticised) bonding agents in the mutual anchoring in the textile articles which is obtained as a result. According to the invention, this stabilisation of the anchoring is achieved because, after the textile articles have been subjected to a linear pressure, they are (further) subjected to a continuous, that is to say surface-like pressure during further transport over a certain distance. This pressure can be less than the linear pressure in the region of the pressure rollers, but must be clearly higher than the pressure exerted by the conveying strands of the conveyor belts, these conveying strands resting on one another.

According to a further proposal of the invention, a further linear pressure effect can be exerted on the textile articles in the region of the surface pressure effect or at the end of the latter, thus ensuring an additional improvement in the quality of the bond.

Surprisingly, when the process according to the invention is used, the necessary temperatures for heating the textile sheet-like structures or the bonding agent are clearly lower than on bonding apparatuses known hitherto. Whilst at least the same quality of the bond between the textile articles is maintained, the reduction in temperature is approximately 20° to 40° C. The decrease in temperature also results in a reduction in shrinkage and colour changes in the textile sheet-like structures and, in general, therefore makes it possible to obtain an energy-saving bond which preserves the outer fabrics and interlinings intact.

The apparatus according to the invention for bonding textile sheet-like structures is equipped, after the heating stations for the bonding agent and after a linear-pressure device (preferably a pair of pressure rollers), with a surface-pressure device which exerts a continuous pressure on the textile articles during their transport.

The surface-pressure device can be formed in various ways, for example from a curved platen and conveying strands guided over this platen under tension and belonging to the conveyor belts.

According to an advantageous exemplary embodiment of the invention, after the linear-pressure device the conveyor belts or their conveying strands are guided under tension around a rotating pressure cylinder with a larger diameter than that of the pressure rollers, in order to generate surface pressure.

The further linear-pressure device provided, if appropriate, preferably consists of a pressure roller which rests against the curved platen or against the pressure cylinder, generating an increased linear pressure in this region.

Further features of the invention relate to the design and arrangement of the linear-pressure and surface-pressure devices and to other improvements in the bonding apparatus.

Figure 2:
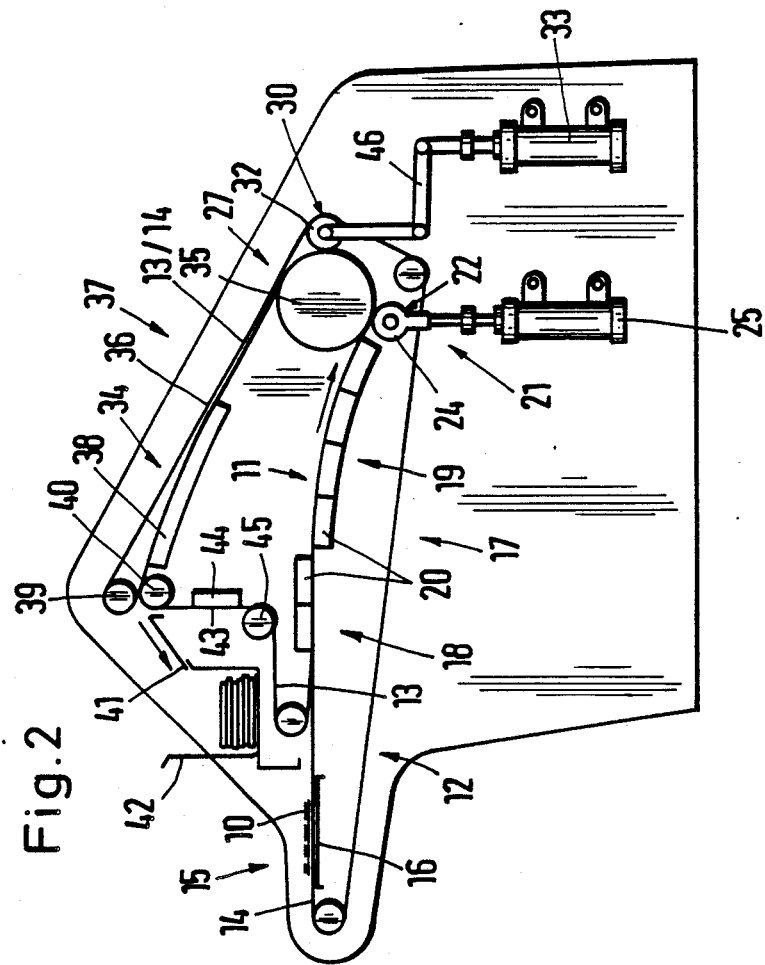

Exemplary embodiments of the invention are explained in more detail below with reference to the drawings. In the drawings:

FIG. 1 shows a diagrammatic side view of a bonding apparatus with a curved platen, FIG. 2 shows an exemplary embodiment of a bonding apparatus with a pressure cylinder, again in a diagrammatic side view.

The bonding apparatuses illustrated as exemplary embodiments work on the basis of a continuous conveyance of textile sheet-like structures 10 to be bonded to one another. These consist respectively of an outer fabric and an interlining coated with a bonding agent. The textile sheet-like structures 10 arranged on top of one another are conveyed continuously by two conveyor belts, in particular by an upper conveyor belt 11 and a lower conveyor belt 12. The conveyor belts 11 and 12 rest against one another by means of their conveying strands 13 and 14 respectively in the region of the transport zone for the textile sheet-like structures 10. The textile sheet-like structures 10, lying between the conveying strands 13 and 14, are conveyed by the conveyor belts 11, 12. The lower conveyor belt 12 is extended on the input side in the region of a feed station 15, in such a way that a slightly inclined feed table 16 for the textile sheet-like structures 10 is formed.

The textile articles 10 to be bonded, are supplied to a heating station 17 by means of the conveyor belts 11, 12. In the exemplary embodiments illustrated, this consists of two heating plates 18 and 19 arranged in succession in the conveying direction, although additional heating plates could be provided if desired or deemed necessary. The heating plates 18, 19 are curved in such a way that the conveying strands 13 and 14 rest against the surfaces of the heating plates 18, 19 under tension. Furthermore, each of the heating plates 18 and 19 consist of individual hollow profiles 20, preferably of a design according to German Offenlegungsschrift 3,303,504, corresponding to U.S. Pat. No. 4,560,431.

In the exemplary embodiment of FIG. 1, the first heating plate 18 is arranged on the underside, that is to say underneath the conveying strand 14, and the second heating plate 19 is arranged above the conveying strand 13, 14. In the alternative design according to FIG. 2, the first smaller heating plate 18 is mounted above the conveying strands 13, 14 and the second heating plate 19 is mounted underneath them.

The heating station 17 is followed by a press station 21. This is equipped with a linear-pressure device 22 in the form of pressure rollers 23, 24 located on both sides of the conveying strands 13, 14. The linear-pressure device 22 is arranged directly adjacent to the (second) heating plate 19. In the present case, the lower pressure roller 24 is movable, in particular can be pressed against the upper pressure roller 23 or the conveying strands 13, 14 by means of a pressure-medium cylinder 25 in conjunction with an actuating linkage 26. A transversely directed linear pressure is generated by the rotating pressure rollers 23, 24 in the region of the textile sheet-like structures 10 conveyed relative to them.

The linear-pressure device 22 is followed immediately by a surface-pressure device 27. This acts on the textile sheet-like structures 10 during their transport, to stabilise the pressed bonding agents.

The surface-pressure device 27 can be designed in various ways. In the exemplary embodiment of FIG. 1, a platen 28 extending in the conveying direction is provided This is curved according to the shape of the heating plates 18, 19, in such a way that the conveying strands 13, 14 rest against the surface of the platen 28 under tension and thereby exert an increased pressing force or surface pressure on the textile sheet-like structures 10 conveyed. As illustrated, the platen 28 can consist of individual hollow profiles 29, for example according to the design of the hollow profiles for the heating plates of German Offenlegungsschrift 3,303,504, corresponding to U.S. Pat. No. 4,560,431. It is also advantageous to heat the platen 28, preferably at a temperature which decreases in the conveying direction).

In the exemplary embodiment of FIG. 1, the platen 28 is followed directly by a further linear-pressure device 30 consisting of two pressure rollers 31 and 32. The lower pressure roller 32 can be subjected to pressure by means of a pressure-medium cylinder 33 and an actuating linkage 46. The upper pressure roller 31 serves at the same time as a deflecting roller for the upper conveyor belt 11. The linear-pressure device 30 achieves a further improvement in the bond between the textile articles bonded together.

A cooling station 34 with a cooling plate 38 of a design known per se follows along the further transport path.

In the particularly advantageous embodiment according to FIG. 2, the surface-pressure device 27 has a pressure cylinder 35 which has a considerably larger diameter than the pressure rollers 32, 24. To generate the increased pressing force or surface pressure, the conveying strands 13, 14 of the conveyor belts 11, 12 are guided under tension round the cylindrical surface of the rotating pressure cylinder 35, specifically through as large a looping angle as possible, in the present case through an angle of approximately 180°. The pressure cylinder 35 can be heated directly, but can also obtain its temperature indirectly from the heated conveyor belts 11, 12.

In this exemplary embodiment, the linear-pressure device 22 is formed by the (lower) pressure roller 24 and the pressure cylindr 35 as a counter pressure. Here, the linear pressure is generated directly in the initial region of the surface pressure.

Furthermore, a second linear-pressure device 30 is formed here in the region where the conveying strands 13, 14 rest against the pressure cylinder 35, in particular by the pressure roller 32 which rests against the periphery of the pressure cylinder 35 and which can be subjected to pressure by means of a pressure-medium cylinder 33 and an actuating linkage 46.

In this exemplary embodiment, the pressure cylinder 35 is at the same time a deflecting cylinder for the two conveyor belts 11, 12. Moreover, the pressure roller 32 acts as a deflecting cylinder for the outer strand 36 of the conveyor belt 12. Accordingly, this is deflected as a whole and guided back towards the feed station 15.

A cooling station 34 is formed in a returning region 37 of the conveyor belts 11, 12, specifically aS a result of the provision of a cooling plate 38 underneath the conveying strands 13, 14.

The conveyor belts 11, 12 are guided in their further course via deflecting rollers 39, 40 located opposite and at a distance from one another. In this region, the bonded sheet-like structures 10 leave the conveyor belts 11 and 12. The ready-bonded textile articles pass via a chute 41 directed obliquely downwards into a collecting container 42 which, here, is arranged directly adjacent to and above the feed station 15.

The (upper) conveyor belt 11 is guided in the direction of the feed station 15 via a further deflecting roller 45 arranged essentially underneath the deflecting roller 40. A preheating device 44 for the conveyor belt 11 is located in the region of a vertical portion 43 of the conveyor belt 11.

As a result of the guidance of the two conveyor belts 11, 12, in particular as a result of the complete deflection of the conveyor belt 12 together with the conveying strand 14, the textile sheet-like structures 10 are transported between two conveying strands 13, 14 after the surface-pressure device 27 and also in the region of the cooling station 34.

I claim:

1. An apparatus for bonding two superposed textile sheets at least one of which is coated with a heat-activatable bonding agent, said apparatus comprising:
   a pair of abutting conveyor belts for conveying the textile sheets in a conveying direction;
   means for supplying the textile sheets between said conveyor belts in the conveying direction;
   at least first and second heating plates, disposed on opposite sides of the conveyor belts, for activating the bonding agent, each of said heating plates comprising a curved platen such that said conveyor belts rest against their associated heating plates under tension;
   a first linear-pressure device, disposed downstream from said heating plates in the conveying direction, for applying a directed linear pressure on the textile sheets, thereby anchoring the bonding agent in the textile sheets, said first linear-pressure device comprising a first pressure roller;
   heated surface-pressure means for stabilizing the anchoring of the bonding agent in the textile sheets and for preventing the sheets from springing apart, said surface pressure means comprising a rotating pressure cylinder which is in pressure contact with said first roller and against which a conveyor belt rests under tension along a part periphery of the pressure cylinder; the textile sheets lying between two conveying strands resting against the pressure cylinder and belonging the conveyor belts; said rotating pressure cylinder being followed by a second linear pressure device comprising a second pressure roller which is located at a distance from the first linear pressure device and which is pressable against said rotating pressure cylinder, said conveying strands passing in pressing contact between said pressure cylinder and said first and second pressure rollers; and
   a cooling station, disposed downstream from said heated surface-pressure means in the conveying direction, for cooling the textile sheets.

2. Apparatus according to claim 1,
   characterised in that conveying strand of the conveyor belts loop round the pressure cylinder along a peripheral region of approximately 180°.

3. Apparatus according to claim 2 wherein the diameter of said pressure cylinder is larger than that of said first and second pressure rollers.

* * * * *